Patented June 16, 1942

2,286,796

UNITED STATES PATENT OFFICE 2,286,796

PURIFICATION OF N-METHYL-P-AMINO-PHENOL

Arthur W. M. Dickins and Lewis J. Behrndt, Rochester, N. Y., assignors to Eastman Kodak Company, Rochester, N. Y., a corporation of New Jersey No Drawing. Application August 9, 1941, Serial No. 406,204

2 Claims. (Cl. 260—574)

This invention relates to a process for the purification of N-methyl-p-aminophenol.

In United States Patent 2,090,651, dated August 24, 1937, a process for preparing N-methyl-p-aminophenol is described, the process comprising the condensation of methyl amine with hydroquinone, in a diluent aqueous solution and at an elevated temperature, in an autoclave. The product obtained in this process, while of sufficient purity for some purposes, is unsatisfactory for others, because the product contained a small amount of N,N'-dimethyl-p-phenylenediamine.

United States Patent 2,090,652, dated August 24, 1937, describes a process for removing the N,N'-dimethyl-p-phenylenediamine from the aforesaid product. The process comprises converting the N-methyl-p-aminophenol containing the phenylenediamine derivative to its metal salt such as its alkali metal salt, and subjecting the resulting salt to steam distillation. While this process of purification suffices to remove the phenylenediamine derivative, the process is time consuming since a protracted steam distillation is required.

We have now found that the aforesaid steam distillation can be considerably shortened by first treating the N-methyl-p-aminophenol containing the phenylenediamine derivative with an alkali metal hydroxide and water in order to convert the phenol to its alkali metal phenate, and then chilling the resulting aqueous solution until N,N'-dimethyl-p-phenylenediamine separates therefrom. The solution obtained after filtering off the phenylenediamine derivative contains but a very small amount of phenylenediamine derivative, which can easily be removed by steam distillation or by treatment with a sorbent such as activated charcoal.

The following example will suffice to illustrate our new process:

110 parts of hydroquinone were dissolved in 360 parts of water to which 4.5 parts of sodium bisulfite had been added. The resulting mixture was charged into an autoclave fitted with a mechanical stirrer and a steam heated coil. The contents of the autoclave were then chilled until all the air was displaced. The autoclave was then closed and the contents heated to 180° C., and the corresponding pressure of approximately 135 pounds per square inch. At this temperature 140 pounds of a 25% (by weight) aqueous solution of methylamine was injected into the autoclave at a uniform rate for a period of three hours. The reaction mixture was then maintained at 180° C. for an additional three hours. At the end of this time, 105 parts of a 40% (by weight) aqueous solution of sodium hydroxide was injected into the autoclave and the pressure was then reduced to atmospheric. The superheat of the charge was utilized to distill off unreacted methylamine and water from the autoclave and to concentrate the reaction mixture to a volume of about 400 parts. This solution was then transferred to a cooling tank equipped with a stirrer and cooled to 0° C. Cooling was continued with stirring for twelve hours. During this period, N,N'-dimethyl-p-phenylenediamine crystallized from the solution. The phenylenediamine derivative was separated from the phenate solution by filtration in a plate and frame filter press. At this stage, 80 to 90% of the phenylenediamine derivative, which was present, had been removed.

To remove the last traces of the phenylenediamine derivative, the phenate solution, i. e., the filtrate, was transferred to a feed tank positioned above a steam stripping column. From the tank the phenate solution was fed continuously into the top of the column while steam was blown into the column at the base countercurrent to the flow of the phenate solution. The phenate solution, free from phenylenediamine derivative, evolved at the base of the column. The phenylenediamine derivative was carried out of the top of the column as mixed vapor with steam, where the vapor can be condensed and the phenylenediamine derivative recovered or discarded. With a single bell plate in the stripping column, the rate of introduction of the phenate solution is advantageously approximately 10 gallons of solution per hour.

The cooling temperature specified in the above example may be varied considerably. A desirable range of temperature, within which crystallization is advantageously carried out, is —6° C. to +10° C. The time permitted for crystallization may be varied, it being understood that the solution should be allowed to stand at any given temperature until equilibrium has been reached and crystal growth of the phenylenediamine derivative is practically complete. The concentration of the alkali metal hydroxide in the phenate solution is apparently not critical. An excess of alkali metal hydroxide from between 1.1 and 2.9 molecular proportion per molecular proportion of N-methyl-p-aminophenol has been employed in the formation of the phenates without any large variation in the crystallization of the phenylenediamine derivative.

The N-methyl-p-aminophenol is advantageously isolated from the phenate solution in the form of its sulfate. To accomplish this, the phenate solution is treated with a sufficient amount of sulfuric acid to convert all of the aminophenol to its sulfate and the resulting solution is concentrated and then chilled until N-methyl-p-aminophenol sulfate separates out.

What we claim as our invention and desire to be secured by Letters Patent of the United States is:

1. In a process for purifying crude N-methyl-p-aminophenol obtained by condensing methyl amine with hydroquinone and containing N,N'-dimethyl-p-phenylenediamine, the step which comprises chilling an aqueous solution of the crude N-methyl-p-aminophenol in the form of its alkali metal salt until N,N'-dimethyl-p-phenylenediamine separates out from the solution.

2. In a process for purifying crude N-methyl-p-amino phenol obtained by condensing methyl amine with hydroquinone and containing N,N'-dimethyl-p-phenylenediamine, the step which comprises chilling an aqueous solution of the crude N-methyl-p-aminophenol in the form of its sodium salt until N,N'-dimethyl-p-phenylenediamine separates out from the solution.

A. W. M. DICKINS.
LEWIS J. BEHRNDT.